US011080128B2

(12) United States Patent
Kuroki et al.

(10) Patent No.: US 11,080,128 B2
(45) Date of Patent: Aug. 3, 2021

(54) AUTOMATIC FAILURE RECOVERY SYSTEM, CONTROL DEVICE, PROCEDURE CREATION DEVICE, AND COMPUTER-READABLE STORAGE MEDIUM

(71) Applicant: KDDI CORPORATION, Tokyo (JP)

(72) Inventors: Keisuke Kuroki, Fujimino (JP);
Michiaki Hayashi, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 112 days.

(21) Appl. No.: 16/553,761

(22) Filed: Aug. 28, 2019

(65) Prior Publication Data

US 2019/0384670 A1 Dec. 19, 2019

Related U.S. Application Data

(63) Continuation of application No. PCT/JP2018/009183, filed on Mar. 9, 2018.

(30) Foreign Application Priority Data

Mar. 29, 2017 (JP) .............................. JP2017-066059

(51) Int. Cl.
*H04L 12/24* (2006.01)
*G06F 11/07* (2006.01)
(Continued)

(52) U.S. Cl.
CPC ........ *G06F 11/0793* (2013.01); *G06F 11/079* (2013.01); *G06F 11/0709* (2013.01);
(Continued)

(58) Field of Classification Search
CPC ............. G06F 11/0793; G06F 11/0709; G06F 11/0751; G06F 11/079; H04L 41/0654; G06N 20/00
See application file for complete search history.

(56) References Cited

U.S. PATENT DOCUMENTS 7,739,207 B2  6/2010  Biazetti et al.
8,024,611 B1  9/2011  Meek et al.
(Continued)

FOREIGN PATENT DOCUMENTS

JP  2008-508760 A  3/2008
JP  2014-127036 A  7/2014
(Continued)

OTHER PUBLICATIONS

Japanese Decision of Refusal for Japanese Patent Application No. 2017-066059 dated May 19, 2020.
(Continued)

*Primary Examiner* — Jonathan D Gibson
(74) *Attorney, Agent, or Firm* — Thomas | Horstemeyer, LLP (57) ABSTRACT

An automatic failure recovery system that, using machine learning, creates an operation procedure for recovering from a network failure or corrects the created operation procedure has a plurality of recovery tasks for recovering from the network failure; outputs failure data indicating network configuration information and failure information acquired upon occurrence of the network failure; selects an execution procedure of the recovery tasks, based on the failure data and a recovery model acquired in advance; executes the selected execution procedure when the network failure occurs; determines whether or not recovery from the network failure was achieved by the execution procedure; and notifies that the procedure is to be corrected, depending upon the result of the determination and a recovery level of the network failure.

9 Claims, 6 Drawing Sheets

(51) Int. Cl.
*G06N 20/00* (2019.01)
*H04L 12/46* (2006.01)

(52) U.S. Cl.
CPC ......... *G06F 11/0751* (2013.01); *G06N 20/00* (2019.01); *H04L 12/4641* (2013.01); *H04L 41/0654* (2013.01); *H04L 41/16* (2013.01)

(56) References Cited

U.S. PATENT DOCUMENTS

| | | | |
|---|---|---|---|
| 8,149,718 B2 | 4/2012 | Marilly et al. | |
| 9,396,060 B2 | 7/2016 | Tsujide | |
| 2007/0220303 A1* | 9/2007 | Kimura | G06F 11/0709 |
| | | | 714/4.11 |
| 2007/0260911 A1* | 11/2007 | Marilly | H04L 41/0663 |
| | | | 714/4.1 |
| 2008/0016017 A1 | 1/2008 | Biazetti et al. | |
| 2009/0052317 A1* | 2/2009 | Takagi | H04L 41/12 |
| | | | 370/223 |
| 2011/0214006 A1 | 9/2011 | Meek et al. | |
| 2014/0181598 A1 | 6/2014 | Tsujide | |
| 2014/0189086 A1* | 7/2014 | Chattopadhyay | H04L 41/0873 |
| | | | 709/223 |
| 2016/0062857 A1 | 3/2016 | Tadano | |
| 2017/0060671 A1* | 3/2017 | Chai | G06F 11/0787 |
| 2019/0373007 A1* | 12/2019 | Salunke | G06F 11/3447 |

FOREIGN PATENT DOCUMENTS

| | | |
|---|---|---|
| JP | 2015-118440 A | 6/2015 |
| WO | 2018/180364 A1 | 10/2018 |

OTHER PUBLICATIONS

Extended European Search Report for European Patent Application No. 18776484.0 dated Jan. 24, 2020.
International Search Report for PCT/JP2018/009183 dated May 22, 2018.

* cited by examiner

| NETWORK NAME | CONSTITUENT FUNCTION | HOST NAME | IP ADDRESS | ToS VALUE | NUMBER OF PEOPLE ACCOMMODATED | NUMBER OF LINKS | NUMBER OF STATIONS USED | MAXIMUM PERMISSIBLE DISCONNECTION TIME | ... |
|---|---|---|---|---|---|---|---|---|---|
| NETWORK A | FIREWALL, ROUTER | FW01, Router01, Router02 | aaa | 5 | 1000 | 5 | aaa | 10 | ... |
| NETWORK B | LOAD BALANCER, ROUTER, VIRTUAL MACHINE | LB01, Router03, VM01 | bbb | 1 | 100 | 3 | bbb | 30 | ... |
| ... | ... | ... | ... | ... | ... | ... | ... | ... | ... |

FIG. 3

| NETWORK NAME | ALARM TYPE | PROCEDURE ORDER |
|---|---|---|
| Network-A | down | {TASK 2 → TASK 1}, {TASK 2 → TASK 3}, {TASK 4 → TASK 2 → TASK 1}, ⋯ |
| Network-A | error | {TASK 3 → TASK 1}, {TASK 2 → TASK 1}, {TASK 5 → TASK 7 → TASK 1}, ⋯ |
| Network-B | down | {TASK 4 → TASK 5}, {TASK 5 → TASK 4}, {TASK 5 → TASK 2 → TASK 1}, ⋯ |
| ⋯ | ⋯ | ⋯ |

AUTOMATIC FAILURE RECOVERY SYSTEM, CONTROL DEVICE, PROCEDURE CREATION DEVICE, AND COMPUTER-READABLE STORAGE MEDIUM

CROSS-REFERENCE TO RELATED APPLICATIONS

This application is a continuation of International Patent Application No. PCT/JP2018/009183 filed on Mar. 9, 2018, which claims priority to and the benefit of Japanese Patent Application No. 2017-066059 filed on Mar. 29, 2017, the entire disclosures of which are incorporated herein by reference.

TECHNICAL FIELD

The present invention relates to a technology for, using machine learning, creating an operation procedure for recovering from a network failure or for correcting the created operation procedure.

BACKGROUND ART

Conventionally, much research and technological development have been conducted in relation to software-defined networking (SDN) and network function virtualization (NFV). For example, PTL 1 discloses a technology for dealing with an abnormality occurring during operation of an automatic operation process. According to PTL 1, in a case where a given operation control is executed in an automatic operation process for automatically executing an operation control for a plurality of computers, if an abnormality is detected in a given computer from among the plurality of computers, from among the configurations of a system including the plurality of computers and the role of each of the plurality of computers, the role of the computer in which the abnormality was detected and the configuration of a system to which the computer belongs are read.

Furthermore, case data including content of an operation control, content of an abnormality, the role of a computer in which the abnormality occurred, the configuration of the system to which the computer belongs, and a response method is read. In this case, case data including a condition that matches or is similar to a condition at least including the content of the given operation control, content of the given abnormality, the role of the given computer, and the configuration of the system to which the given computer belongs is read out.

CITATION LIST

Patent Literature

PTL1: Japanese Patent Laid-Open No. 2014-127036

SUMMARY OF INVENTION

Technical Problem

Conventionally, expectations have been held for using automatic operation in virtual networks built using SDN and NFV to achieve efficient operation. However, if the types of virtual networks diversify in the future, the abnormality recovery patterns for the virtual networks will also diversify and it will be difficult to create and manage operation flows (procedures) for automatic recovery.

Even with the technology disclosed in PTL 1, while a parameter value used in a task in an operation flow is automatically corrected (updated) if the task is unsuccessful after execution, correction of the flow is not supported. Due to this, a case in which the correction of a flow itself is required cannot be dealt with.

The present invention has been contrived in view of such circumstances, and aims to provide an automatic failure recovery system, a control device, a procedure creation device, and a computer-readable storage medium that can reduce work involved by using and having machine learning execute the creation and correction of an operation flow to omit the creation and correction of an operation flow by a human.

Solution to Problem

According to one aspect of the present invention, an automatic failure recovery system that, using machine learning, creates an operation procedure for recovering from a network failure or corrects the created operation procedure includes: a recovery execution unit configured to have a plurality of recovery tasks for recovering from the network failure; a parameter creation unit configured to output failure data indicating network configuration information and failure information acquired upon occurrence of the network failure; a learning unit configured to select an execution procedure of the recovery tasks, based on the failure data and a recovery model acquired in advance; a procedure execution unit configured to execute the selected execution procedure when the network failure occurs; a success determination unit configured to determine whether or not recovery from the network failure was achieved by the execution procedure; and a procedure correction unit configured to notify the learning unit that the procedure is to be corrected, depending upon the result of the determination and a recovery level of the network failure.

Advantageous Effects of Invention

According to the present invention, it is possible to create or correct an operation procedure for automatically recovering from a network failure. Accordingly, it is possible to reduce the work involved in recovering from a failure and creating and correcting a recovery procedure related to the recovery from a failure, and to achieve prompt recovery and maintain a recovery procedure to be used to deal with a failure.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings are included in and constitute a part of the specification, and the accompanying drawings illustrate an embodiment of the present invention and are used, along with the description thereof, to explain the principles of the present invention.

DESCRIPTION OF EMBODIMENT

The inventors of the present invention focused on the fact that, while expectations were held for using automatic operation in virtual networks built using SDN and NFV to achieve efficient operation, if the types of virtual networks diversify in the future, the abnormality recovery patterns for the virtual networks will also diversify and it will be difficult to create and manage operation flows (procedures) for automatic recovery. The inventors of the present invention found that work involved can be reduced by using and having machine learning execute the creation and correction of an operation flow to omit the creation and correction of an operation flow by a human, and thus arrived at the present invention.

Figure 1:
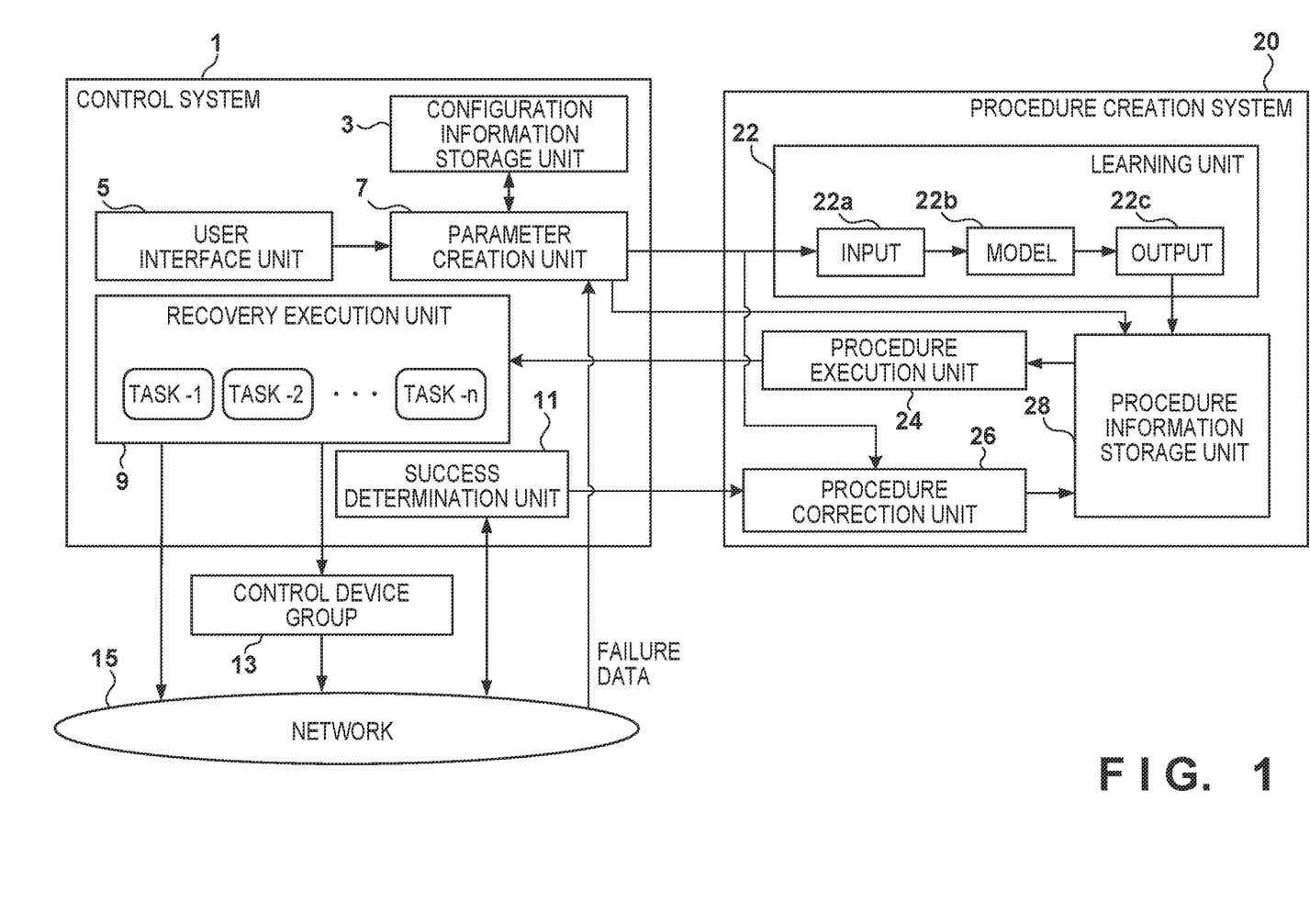
FIG. 1 is a diagram illustrating a schematic configuration of an automatic failure recovery system pertaining to the present embodiment.

FIG. 1 is a diagram illustrating a schematic configuration of an automatic failure recovery system pertaining to the present embodiment. This automatic failure recovery system includes a control system 1 and a procedure creation system 20. The control system 1 includes a configuration information storage unit 3, a user interface unit 5, a parameter creation unit 7, a recovery execution unit 9, which is a recovery unit and has "Task-1, Task-2, . . . , Task-n", and a success determination unit 11. The procedure creation system 20 includes a learning unit 22 that includes input 22a, a model 22b, and output 22c. Furthermore, the procedure creation system 20 includes a procedure execution unit 24, a procedure correction unit 26, and a procedure information storage unit 28. The control system 1 executes recovery of a control device group 13 or a network 15, and the procedure creation system 20 creates recovery procedures.

Figure 2:
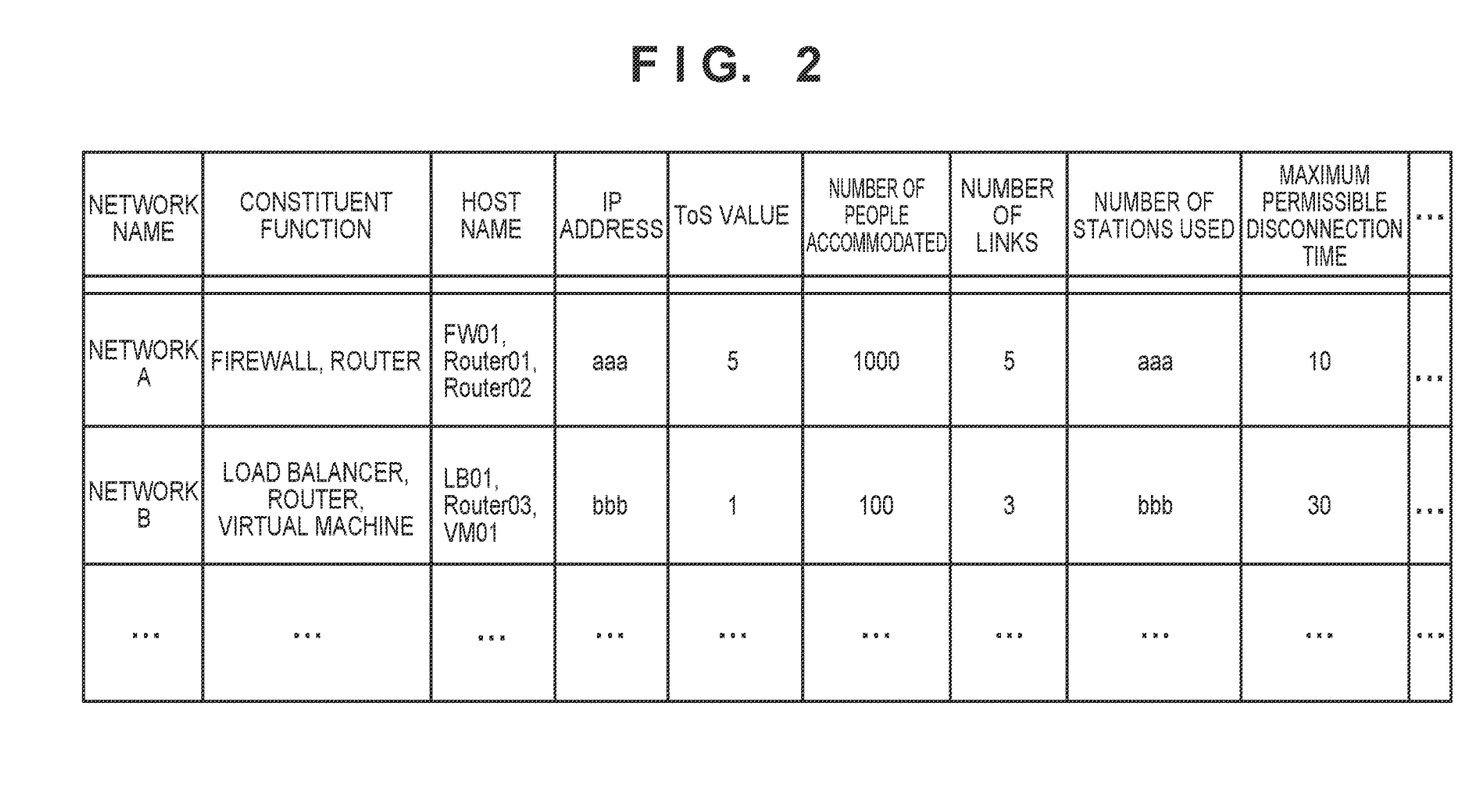
FIG. 2 is a diagram illustrating one example of information stored in a configuration information storage unit 3.

FIG. 2 is a diagram illustrating one example of information stored in the configuration information storage unit 3. The configuration information storage unit 3 stores network configuration information, and is used to determine, based on failure information (an alarm or the like), in which network a failure has occurred, and to create parameters to be output to the learning unit 22. In FIG. 2, a network name, constituent functions such as a firewall and a router, a host name, an IP address, a ToS value, the number of people accommodated, the number of links, the number of stations used, a maximum permissible disconnection time, etc., are stored, for example.

Figure 3:
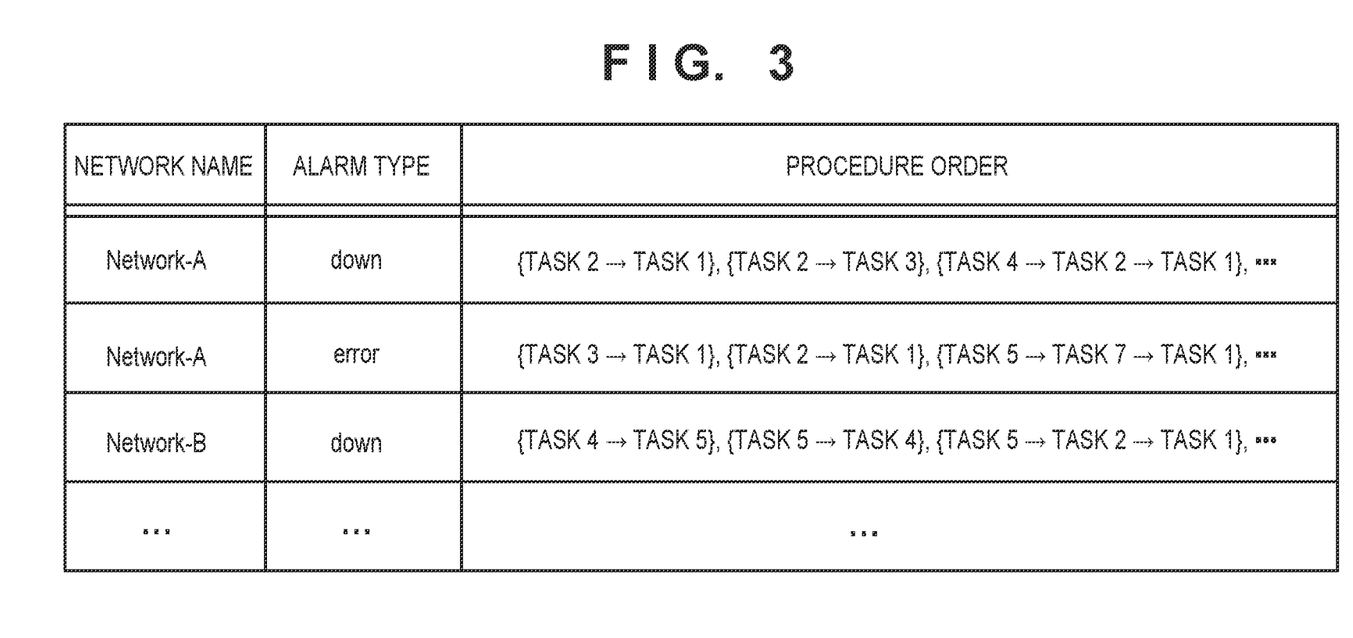
FIG. 3 is a diagram illustrating one example of information stored in a procedure information storage unit 28.

FIG. 3 is a diagram illustrating one example of information stored in the procedure information storage unit 28. For each type of network alarm, the procedure information storage unit 28 stores combinations (i.e., procedures) of tasks in order of probability. The combinations (procedures) of tasks are derived by the model 22b of the learning unit 22. Upon a failure occurring, the procedure information storage unit 28 is used to contact the procedure execution unit 24, and is also used in a case in which the procedure correction unit 26 is to be made to execute the next most probable procedure.

Figure 4A:
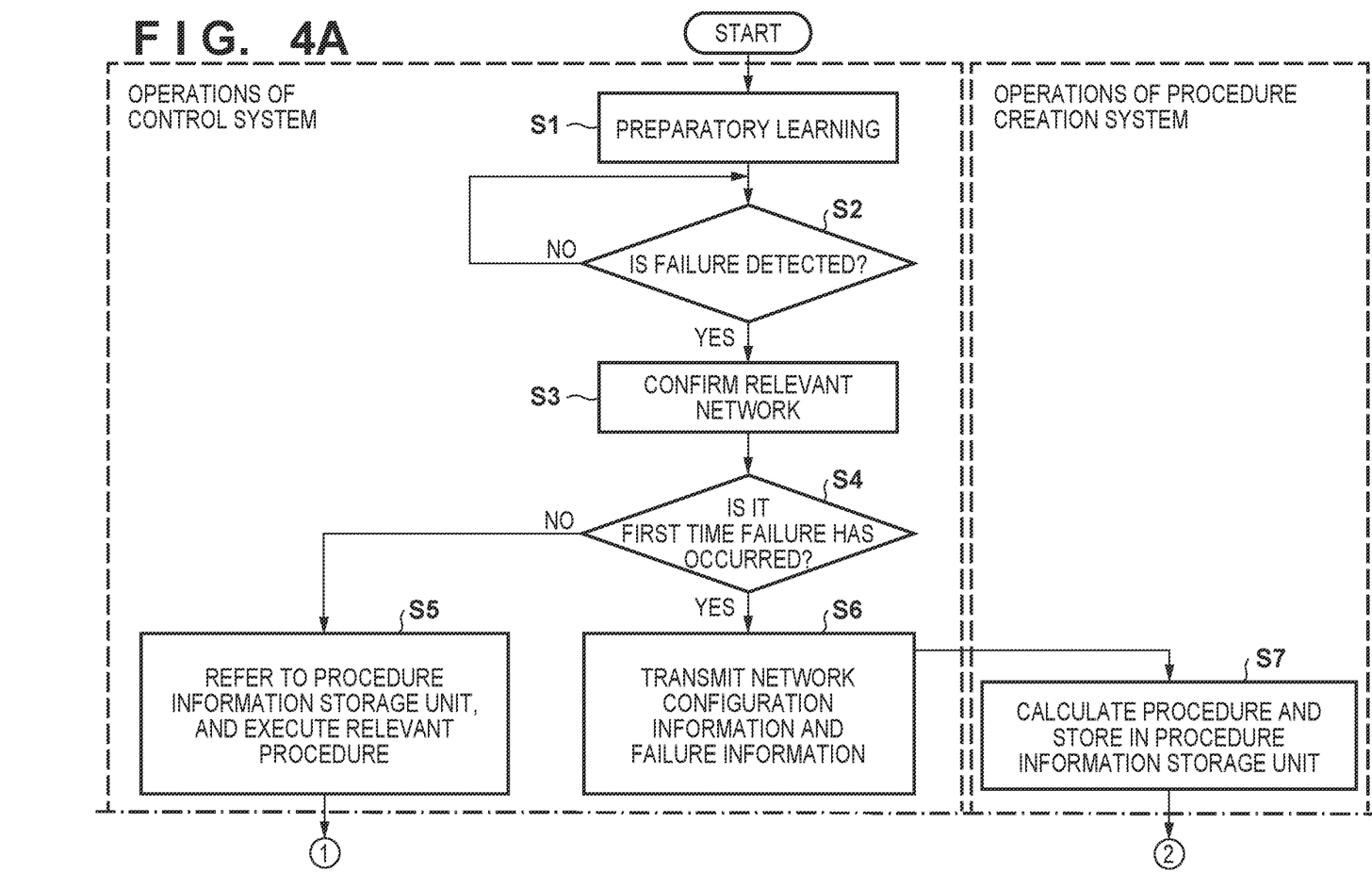
FIG. 4A is a flowchart illustrating operations of the automatic failure recovery system pertaining to the present embodiment.
Figure 4B:
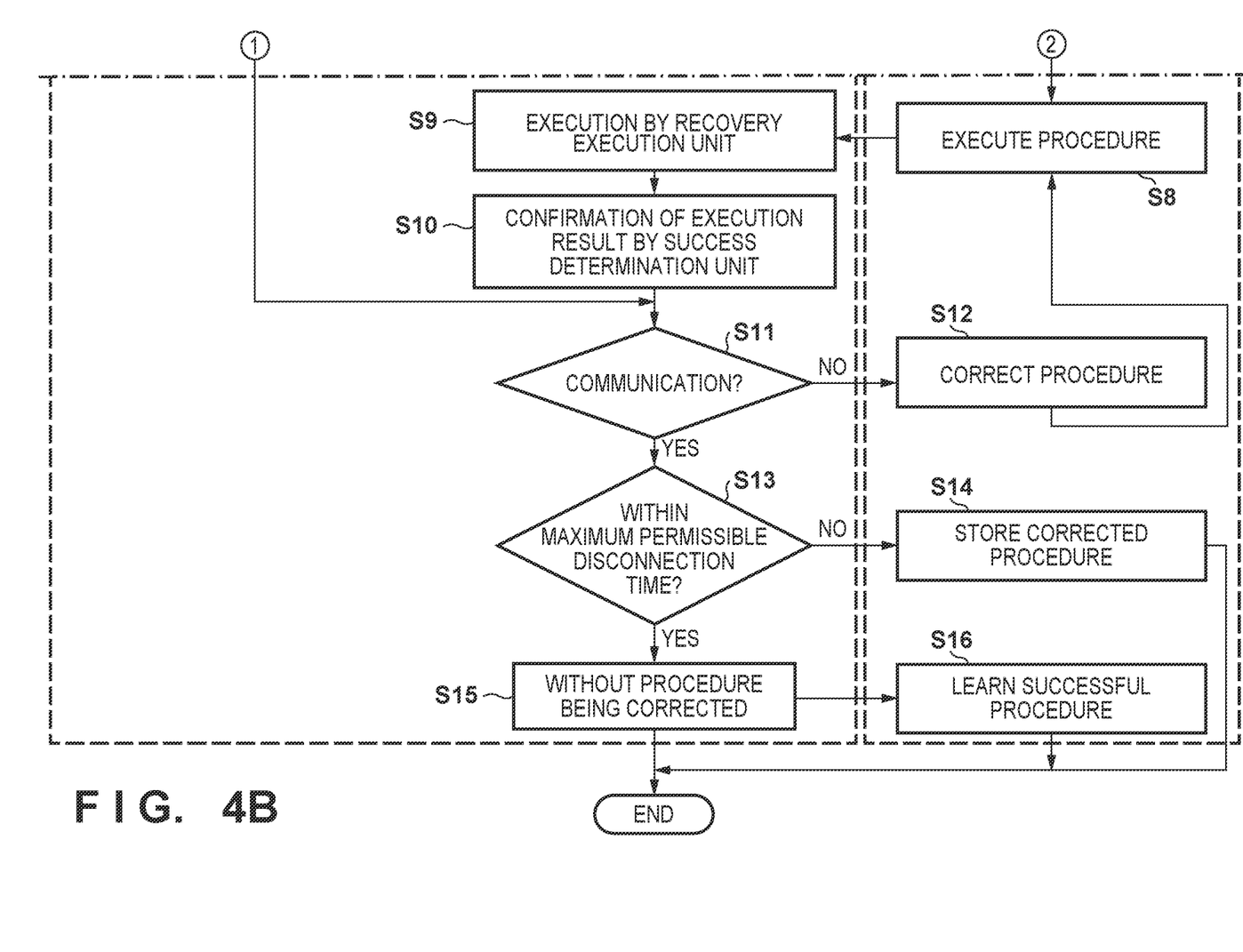
FIG. 4B is a flowchart illustrating operations of the automatic failure recovery system pertaining to the present embodiment.

FIGS. 4A and 4B are flowcharts illustrating operations of the automatic failure recovery system pertaining to the present embodiment. In FIGS. 4A and 4B, operations of the control system and the operations of the procedure creation system are shown separately. First, preparatory learning is performed (step S1). As a precondition, the control system 1 has a plurality of recovery tasks, as illustrated in FIG. 1. For example, an "API call" made by the control system 1, etc., corresponds to a recovery task. In step S1, a user inputs, via the user interface unit 5, created network configuration information, information regarding a failure having previously occurred in the network, and a combination (a procedure, a flow) of tasks that correspond thereto, to the learning unit 22 via the parameter creation unit 7. The learning unit 22 creates the model 22b based on the input 22a. However, the network configuration information and the failure information, and the combination of tasks corresponding thereto, etc., may be random data, because the intention here is to create the model 22b in the learning unit 22. That is, the model 22b need not be perfect.

In this case, the learning unit 22 uses machine learning such as deep learning, for example. As a result of the input 22a (the network configuration information and the failure information) and the output 22c (the combination of tasks) being learnt, the model 22b from input to output can be automatically created. The parameter creation unit 7 has two main functions. That is, the parameter creation unit 7 has the function of storing the network configuration information provided by the user to the configuration information storage unit 3, and the function of performing conversion into numerical values and standardization on the network configuration information, the failure information, etc., and inputting such information to the learning unit 22.

Next, whether or not a failure was detected is determined (step S2). This determination is repeated if no failure is detected, and if a failure is detected, processing transitions to step S3 and the relevant network is confirmed. Then, it is determined whether or not this is the first time the present failure has occurred (step S4). If this is the first time the present failure has occurred, the network configuration information and the failure information are transmitted to the procedure creation system 20 (step S6). That is, the failure information is sent out from the network to the parameter creation unit 7 of the control system 1. The failure information in this case is an alarm or the like issued by a network device when a failure occurs, for example. The parameter creation unit 7 refers to the information in the configuration information storage unit 3 and derives, based on the alarm information, in which network a failure has occurred. Subsequently, the alarm information and the network configuration information derived from the configuration information storage unit 3 are converted into numerical values and standardized, and are input to the learning unit 22 of the procedure creation system as the input 22a.

Based on the input 22a, the learning unit 22 uses the model 22b built in step S1 to derive combinations (flows) of tasks for the alarm corresponding to the relevant network, and stores combinations (flows) of tasks in the procedure information storage unit 28 (step S7). Note that, in addition to the network name and the failure alarm, the order of probability of the derived combinations of tasks is stored in the procedure information storage unit 28. The procedure information storage unit 28, after storing the information, instructs the procedure execution unit 24 to execute relevant tasks. The procedure execution unit 24 instructs the recovery execution unit 9 of the control system 1 to execute the tasks (step S8), and the recovery execution unit 9 executes the instructed tasks in the requested order. The execution of recovery in this case may be performed directly on network devices, etc., or may be performed by providing a different control device group with instructions via an API, etc.

The success determination unit 11 determines whether or not recovery from the failure was achieved with the combination of tasks executed as described above, and whether or not the maximum permissible disconnection time defined for the network was satisfied (step S10). A conventional technology can be applied for this checking process. For example, a method can be applied in which a virtual traffic generator is prepared for each network in advance, communication of packets is performed at all times, and the disconnection time, whether or not communication can be performed, etc., are checked by making inquiries to the traffic generator.

Next, whether or not communication can be performed as a result of the determination by the success determination unit 11 is determined (step S11). If communication cannot be performed, correction to a procedure that is next most probable, with respect to the most-recently executed procedure, is performed by the procedure information storage unit 28 (step S12), and the corrected procedure is executed (step S8). On the other hand, if communication could be performed in step S11, whether or not the maximum permissible disconnection time was satisfied is determined (step S13). If the maximum permissible disconnection time was not satisfied, information is corrected so that the procedure that is next most probable, with respect to the most-recently executed procedure, is executed the next time the failure occurs and the corrected procedure is stored in the procedure information storage unit 28, and then processing is terminated (step S14). On the other hand, if the maximum permissible disconnection time was satisfied in step S13, the procedure information storage unit 28 notifies the procedure correction unit 26 of the procedure without the procedure being corrected (step S15), and the procedure correction unit 26 causes relearning of the successful procedure to be performed via the learning unit 22 and terminates processing (step S16).

On the other hand, if the parameter creation unit 7 determines that this is not the first time the present failure has occurred in step S4, processing transitions to step S5 and the procedure information storage unit 28 is referred to and the relevant procedure is executed, and then processing transitions to step S11.

As described above, if communication could not be performed in step S11, processing transitions to step S12, step S8, step S9, and step S10, and these steps are repeated until communication can be performed. Furthermore, if communication could be performed in step S11 but the condition of the maximum permissible disconnection time could not be satisfied, the procedure to be executed next is changed and is thus stored. Accordingly, the procedure that was executed most recently and could not satisfy the maximum permissible disconnection time will not be executed the next time the failure occurs.

Modification

Figure 5:
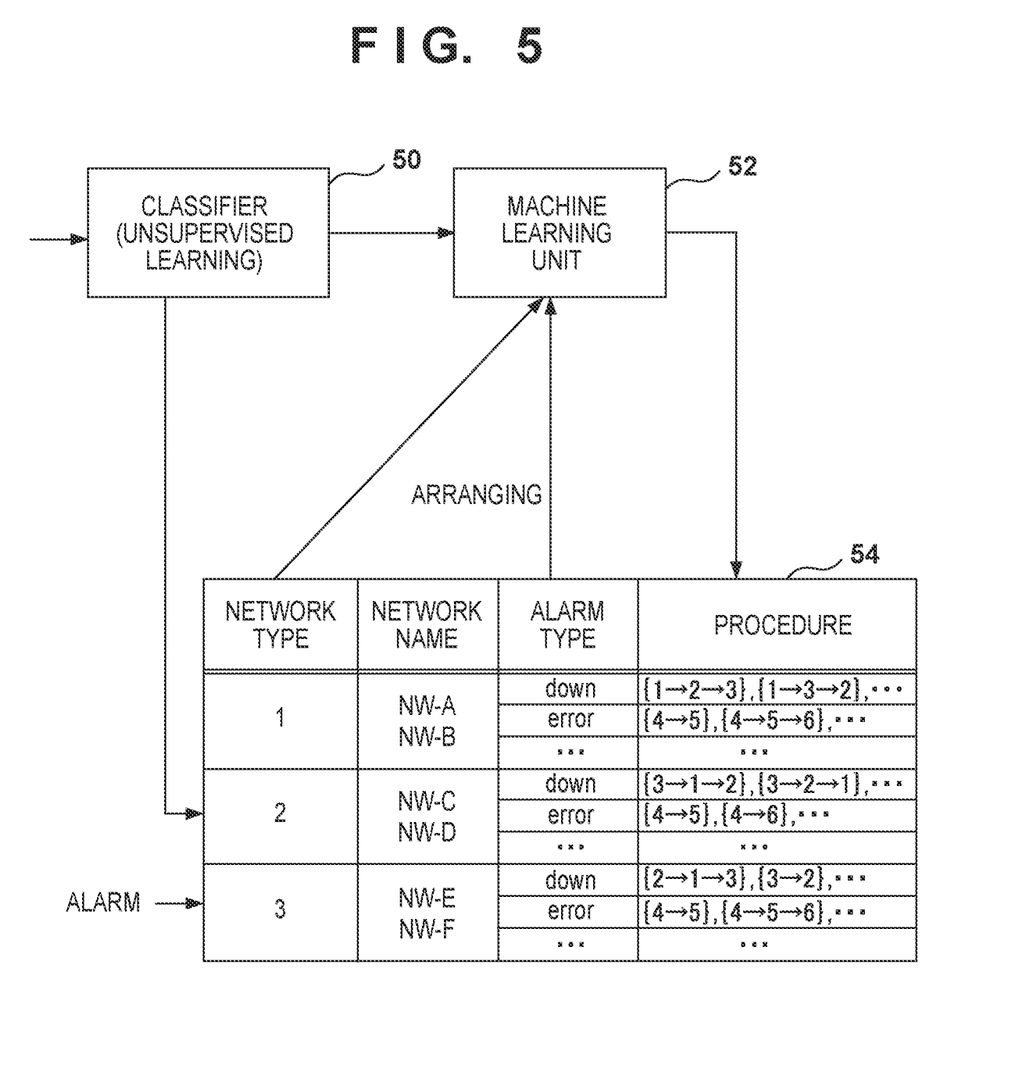
FIG. 5 is a diagram illustrating a modification of the present embodiment.

FIG. 5 is a diagram illustrating a modification of the present embodiment. The automatic failure recovery system pertaining to the present embodiment includes a classifier 50 that classifies networks based on network configuration information using unsupervised learning, and a machine learning unit 52 that executes an algorithm or machine learning, and classification results and corresponding procedures are registered in a table 54. Note that the machine learning unit 52 is substantially the same as the learning unit 22 illustrated in FIG. 1.

The classifier 50 performs clustering of networks based on network configurations, and classifies the networks into network types. In FIG. 5, an example is illustrated in which NW-A and NW-B are classified into network type 1, and NW-C and NW-D are classified into network type 2. If the alarm type is "down", a procedure in which tasks are executed in the order of tasks 1, 2, and 3 is registered first, and a procedure in which tasks are executed in the order of tasks 1, 3, and 2 is registered second as procedures for network type 1.

With such a configuration, the same execution procedure can be selected for networks of the same network type if a failure occurs in a given network, and thus, randomization of execution data can be suppressed and prompt recovery can be achieved.

Note that at least one of the processes performed by the control system 1 or the procedure creation system 20 pertaining to the present embodiment may be realized by a processor, etc., executing a program. Furthermore, such a program may be stored in a storage medium such as a hard disk or a silicon drive.

As described above, according to the present embodiment, a failure recovery procedure can be automatically created when a failure occurs in a network. Furthermore, correction of the failure recovery procedure can be automatically executed. Also, through machine learning with artificial intelligence, failures occurring for the second time and more can be dealt with immediately. Due to this, there is no need to realize the creation and management of recovery procedure manuals for networks manually, and this contributes to a reduction in work involved. Furthermore, automatic recovery can be executed through cooperation with a control system that executes recovery.

(1) Furthermore, according to the present embodiment, the automatic failure recovery system is an automatic failure recovery system that, using machine learning, creates an operation procedure for recovering from a network failure or corrects the created operation procedure, the automatic failure recovery system characterized by including: a recovery execution unit that has a plurality of recovery tasks for recovering from the network failure; a parameter creation unit that outputs failure data indicating network configuration information and failure information acquired upon occurrence of the network failure; a learning unit that selects an execution procedure of the recovery tasks, based on the failure data and a recovery model acquired in advance; a procedure execution unit that executes the selected execution procedure when the network failure occurs; a success determination unit that determines whether or not recovery from the network failure was achieved by the execution procedure; and a procedure correction unit that notifies the learning unit that the procedure is to be corrected, depending upon the result of the determination and a recovery level of the network failure, as described above.

In such a manner, an operation procedure for achieving automatic recovery of a network failure can be created or corrected because a plurality of recovery tasks for recovering from the network failure are in possession, failure data indicating network configuration information and failure information acquired upon the occurrence of the network failure is output, an execution procedure of the recovery tasks is selected based on the failure data and a recovery model acquired in advance, the selected execution procedure is executed when the network failure occurs, a determination is made as to whether or not recovery from the network failure was achieved by the execution procedure, and the learning unit is notified that the procedure is to be corrected, depending upon the result of the determination and a recovery level of the network failure. Accordingly, it is possible to reduce the work involved in recovering from a failure and creating and correcting a recovery procedure related to the recovery from a failure, and to achieve prompt recovery and maintain a recovery procedure to be used to deal with a failure.

(2) Furthermore, according to the present embodiment, the automatic failure recovery system is characterized in that, if the network is capable of communication and a maximum permissible disconnection time is satisfied, the success determination unit notifies the learning unit of the execution procedure, as a successful procedure, via the procedure correction unit, and causes the learning unit to learn the execution procedure, as described above.

In such a manner, if the network is capable of communication and a maximum permissible disconnection time is satisfied, the success determination unit notifies the learning unit of the execution procedure, as a successful procedure, and causes the learning unit to learn the execution procedure. Thus, even if a similar network failure occurs again, prompt recovery from the failure is possible.

(3) Furthermore, according to the present embodiment, the automatic failure recovery system is characterized in that, if the network is capable of communication but a maximum permissible disconnection time is not satisfied, the success determination unit notifies the procedure correction unit that an execution procedure that is next most probable, with respect to the execution procedure, is to be executed next time the network failure occurs, the procedure correction unit selects the execution procedure that is next most probable, with respect to the execution procedure, and the procedure execution unit executes the execution procedure selected by the procedure correction unit next time the network failure occurs, as described above.

In such a manner, if the network is capable of communication but a maximum permissible disconnection time is not satisfied, the success determination unit notifies the procedure correction unit that an execution procedure that is next most probable, with respect to the execution procedure, is to be executed next time the network failure occurs, the procedure correction unit selects the execution procedure that is next most probable, with respect to the execution procedure, and the procedure execution unit executes the execution procedure selected by the procedure correction unit next time the network failure occurs. Thus, even if a similar network failure occurs again, the likelihood of promptly recovering from the failure can be increased.

(4) Furthermore, according to the present embodiment, the automatic failure recovery system is characterized in that, if the network is not capable of communication, the success determination unit notifies the procedure correction unit that an execution procedure that is next most probable, with respect to the execution procedure, is to be executed, the procedure correction unit selects the execution procedure that is next most probable, with respect to the execution procedure, and the procedure execution unit executes the execution procedure selected by the procedure correction unit, as described above.

In such a manner, if the network is not capable of communication, the success determination unit notifies the procedure correction unit that an execution procedure that is next most probable, with respect to the execution procedure, is to be executed, the procedure correction unit selects the execution procedure that is next most probable, with respect to the execution procedure, and the procedure execution unit executes the execution procedure selected by the procedure correction unit. Thus, execution procedures using the recovery tasks are executed until the network is capable of communication. Accordingly, prompt recovery from a network failure can be achieved.

(5) Furthermore, according to the present embodiment, the automatic failure recovery system is characterized in that the parameter creation unit creates the failure data by performing conversion into numerical values and standardization on the failure information and the network configuration information, and the learning unit uses the failure data as input and creates the recovery model, as described above.

In such a manner, the parameter creation unit creates the failure data by performing conversion into numerical values and standardization on the failure information and the network configuration information, and the learning unit uses the failure data as input and creates the recovery model. Thus, machine learning with artificial intelligence can be used to achieve prompt recovery from a network failure.

(6) Furthermore, according to the present embodiment, the automatic failure recovery system is characterized by further including a classifier that classifies networks into groups based on network configuration information and provides each of the groups with information indicating a network type, and in that the learning unit, for networks of the same network type, selects the same execution procedure when a failure occurs, as described above.

In such a manner, networks are classified into groups based on network configuration information and each of the groups is provided with information indicating a network type, and for networks of the same network type, the same execution procedure is selected when a failure occurs. Thus, prompt recovery can be achieved. That is, the tendency for failures to occur is similar for networks included in the same network type, and thus, recovery is facilitated by executing an already-selected execution procedure as is.

(7) Furthermore, according to the present embodiment, the control device is a control device to be applied to an automatic failure recovery system that, using machine learning, creates an operation procedure for recovering from a network failure or corrects the created operation procedure, the control device characterized by including: a recovery execution unit that has a plurality of recovery tasks for recovering from the network failure; a parameter creation unit that outputs failure data indicating network configuration information and failure information acquired upon occurrence of the network failure; and a success determination unit that, after an execution procedure of the recovery tasks that has been selected based on the failure data and a recovery model acquired in advance is executed, determines whether or not recovery from the network failure was achieved by the execution procedure, as described above.

With this configuration, it is possible to build a system for creating or correcting an operation procedure for automatically recovering from a network failure. Consequently, the work involved in recovering from a failure can be reduced and prompt recovery can be achieved.

(8) Furthermore, according to the present embodiment, the procedure creation device is a procedure creation device to be applied to an automatic failure recovery system that, using machine learning, creates an operation procedure for recovering from a network failure or corrects the created operation procedure, the procedure creation device characterized by including: a learning unit that selects an execution procedure of a plurality of recovery tasks for recovering from the network failure based on a recovery model acquired in advance and failure data indicating network configuration information and failure information acquired upon occurrence of the network failure; a procedure execution unit that executes the selected execution procedure when the network failure occurs; and a procedure correction unit that notifies the learning unit that the procedure is to be corrected, depending upon a recovery level of the network failure and the result of a determination as to whether or not recovery from the network failure was achieved by the execution procedure, as described above.

With this configuration, it is possible to build a system for creating or correcting an operation procedure for automatically recovering from a network failure. Consequently, it is possible to reduce the work involved in recovering from a failure and creating and correcting a recovery procedure related to the recovery from a failure, and to achieve prompt recovery and maintain a recovery procedure to be used to deal with a failure.

(9) Furthermore, the program pertaining to the present embodiment is a program for a control device to be applied to an automatic failure recovery system that, using machine learning, creates an operation procedure for recovering from a network failure or corrects the created operation procedure, characterized in that the program causes a computer to execute a sequence of processing including: processing for outputting failure data indicating network configuration information and failure information acquired upon occurrence of the network failure, the processing being performed by a parameter creation unit; and processing for, after an execution procedure of a plurality of recovery tasks for recovering from the network failure is executed, the execution procedure having been selected based on the failure data and a recovery model acquired in advance, determining whether or not recovery from the network failure was achieved by the execution procedure, the processing being performed by a success determination unit, as described above.

With this configuration, it is possible to build a system for creating or correcting an operation procedure for automatically recovering from a network failure. Consequently, it is possible to reduce the work involved in recovering from a failure and for creating and correcting a recovery procedure related to the recovery from a failure, and to achieve prompt recovery and maintain a recovery procedure to be used to deal with a failure.

(10) Furthermore, the program pertaining to the present embodiment is a program for a procedure creation device to be applied to an automatic failure recovery system that, using machine learning, creates an operation procedure for recovering from a network failure or corrects the created operation procedure, characterized in that the program causes a computer to execute a sequence of processing including: processing for selecting an execution procedure of a plurality of recovery tasks for recovering from the network failure based on a recovery model acquired in advance and failure data indicating network configuration information and failure information acquired upon occurrence of the network failure, the processing being performed by a learning unit; processing for executing the selected execution procedure when the network failure occurs, the processing being performed by a procedure execution unit; and processing for providing the learning unit with a notification that the procedure is to be corrected, depending upon a recovery level of the network failure and the result of a determination as to whether or not recovery from the network failure was achieved by the execution procedure, the processing being performed by a procedure correction unit, as described above.

With this configuration, it is possible to build a system for creating or correcting an operation procedure for automatically recovering from a network failure. Consequently, it is possible to reduce the work involved in recovering from a failure and creating and correcting a recovery procedure related to the recovery from a failure, and to achieve prompt recovery and maintain a recovery procedure to be used to deal with a failure.

The present invention is not limited to the above embodiment and various changes and modifications can be made within the spirit and scope of the present invention. Therefore, to apprise the public of the scope of the present invention, the following claims are made.

The invention claimed is:

1. An automatic failure recovery system that, using machine learning, creates an operation procedure for recovering from a network failure or corrects the created operation procedure, the automatic failure recovery system comprising:
   at least one processor circuit with a memory comprising instructions, that when executed by the processor circuit, causes the processor circuit to at least:
      maintain a plurality of recovery tasks for recovering from the network failure;
      output failure data indicating network configuration information and failure information acquired upon occurrence of the network failure;
      select an execution procedure of the recovery tasks, based on the failure data and a recovery model acquired in advance;
      execute the selected execution procedure when the network failure occurs;
      determine whether or not recovery from the network failure was achieved by the execution procedure; and
      notify that the procedure is to be corrected, depending upon the result of the determination and a recovery level of the network failure,
   wherein, if the network is not capable of communication, a notification that an execution procedure that is next most probable, with respect to the execution procedure, is to be executed, is performed,
   the execution procedure that is next most probable, with respect to the execution procedure, is selected, and
   the selected execution procedure is executed by the automatic failure recovery system.

2. The automatic failure recovery system according to claim 1, wherein, if the network is capable of communication and a maximum permissible disconnection time is satisfied, the execution procedure, as a successful procedure, is notified.

3. The automatic failure recovery system according to claim 1,
   wherein, if the network is capable of communication but a maximum permissible disconnection time is not satisfied, an execution procedure that is next most probable, with respect to the execution procedure, is to be executed next time the network failure occurs, is notified,
   the execution procedure that is next most probable, with respect to the execution procedure is selected, and the selected execution procedure is notified, and
   the selected execution procedure the next time the network failure occurs is executed.

4. The automatic failure recovery system according to claim 1,
wherein the failure data by performing conversion into numerical values and standardization on the failure information and the network configuration information is created by the automatic failure recovery system, and
the failure data as input is used and the recovery model is created by the automatic failure recovery system.

5. The automatic failure recovery system according to claim 1, the memory further comprising instructions, that when executed by the processor circuit, causes the processor circuit to at least:
classify networks into groups based on network configuration information and provides each of the groups with information indicating a network type,
wherein for networks of the same network type, the same execution procedure is selected when a failure occurs.

6. A control device to be applied to an automatic failure recovery system that, using machine learning, creates an operation procedure for recovering from a network failure or corrects the created operation procedure, the control device comprising:
at least one processor circuit with a memory comprising instructions, that when executed by the processor circuit, causes the processor circuit to at least:
maintain a plurality of recovery tasks for recovering from the network failure;
output failure data indicating network configuration information and failure information acquired upon occurrence of the network failure; and
after an execution procedure of the recovery tasks that has been selected based on the failure data and a recovery model acquired in advance is executed, determine whether or not recovery from the network failure was achieved by the execution procedure,
wherein, if the network is not capable of communication, a notification that an execution procedure that is next most probable, with respect to the execution procedure, is to be executed, is performed by the control device.

7. A procedure creation device to be applied to an automatic failure recovery system that, using machine learning, creates an operation procedure for recovering from a network failure or corrects the created operation procedure, the procedure creation device characterized by comprising:
at least one processor circuit with a memory comprising instructions, that when executed by the processor circuit, causes the processor circuit to at least:
select an execution procedure of a plurality of recovery tasks for recovering from the network failure, based on a recovery model acquired in advance and failure data indicating network configuration information and failure information acquired upon occurrence of the network failure;
execute the selected execution procedure when the network failure occurs; and
notify that the procedure is to be corrected, depending upon a recovery level of the network failure and the result of a determination as to whether or not recovery from the network failure was achieved by the execution procedure,
wherein, if the network is not capable of communication, a notification that an execution procedure that is next most probable, with respect to the execution procedure, is to be executed, is received by the procedure creation device,
the execution procedure that is next most probable, with respect to the execution procedure, is selected, and
the selected execution procedure is executed.

8. A computer-readable storage medium storing a program to be executed by one or more processors of a control device to be applied to an automatic failure recovery system that, using machine learning, creates an operation procedure for recovering from a network failure or corrects the created operation procedure,
wherein, when executed by the one or more processors, the program causes the control device to execute:
processing for outputting failure data indicating network configuration information and failure information acquired upon occurrence of the network failure; and
processing for, after an execution procedure of a plurality of recovery tasks for recovering from the network failure is executed, the execution procedure having been selected based on the failure data and a recovery model acquired in advance, determining whether or not recovery from the network failure was achieved by the execution procedure,
wherein, if the network is not capable of communication, a notification that an execution procedure that is next most probable, with respect to the execution procedure, is to be executed, is received in the processing for determining.

9. A computer-readable storage medium storing a program to be executed by one or more processors of a procedure creation device to be applied to an automatic failure recovery system that, using machine learning, creates an operation procedure for recovering from a network failure or corrects the created operation procedure,
wherein, when executed by the one or more processors, the program causes the procedure creation device to execute:
processing for selecting an execution procedure of a plurality of recovery tasks for recovering from the network failure based on a recovery model acquired in advance and failure data indicating network configuration information and failure information acquired upon occurrence of the network failure;
processing for executing the selected execution procedure when the network failure occurs; and
processing for providing a notification that the procedure is to be corrected, depending upon a recovery level of the network failure and the result of a determination as to whether or not recovery from the network failure was achieved by the execution procedure,
wherein, if the network is not ca able of communication, a notification that an execution procedure that is next most probable, with respect to the execution procedure, is to be executed, is provided in the processing for providing,
the execution procedure that is next most probably, with respect to the executing procedure is selected in the processing for selecting, and
the selected execution procedure is executed in the processing for executing.

* * * * *